Patented July 31, 1945

2,380,599

UNITED STATES PATENT OFFICE 2,380,599

PLASTICIZED RESIN COMPOSITIONS

Harry Kline, North Plainfield, N. J., assignor to Bakelite Corporation, New York, N. Y., a corporation of New Jersey No Drawing. Application May 16, 1941,
Serial No. 393,775

7 Claims. (Cl. 260—25)

This invention relates to phenolic resin varnishes incorporating plasticizing agents to impart flexibility.

In general phenolic resins used in varnishes intended to be used as binders for the manufacture of laminated materials are of a nature yielding material that is lacking in flexibility. To improve the flexibility, plasticizing agents are included which are compatible with the varnishes, i. e. solvent solutions of the resin; by so doing the laminated materials are made available for stock that can be punched or sheared into various shapes for insulation and the like. Plasticizers commonly used include certain vegetable oils as tung oil and alkyl phthalates. Such plasticizers, however, have a decidedly destructive effect on water resistance which is a property of prime importance for electrical insulating parts; furthermore, they are apt to injuriously modify the electrical properties of the laminated material.

According to the present invention there is incorporated with phenolic resins or solutions thereof, as hereinafter described, alkyl esters of rosin or abietic acid and preferably methyl abietate. These have been found to be compatible with the phenolic resins or their solutions in amounts required for producing laminated with good punching characteristics and in addition imparting improved electrical properties and resistance to water and alkalies as compared with the known plasticizers. For obtaining these effects more than 10 percent and generally from 20 to 30 per cent of the methyl abietate based on the weight of the total resinous content is required; above 30 per cent there is a tendency for the plasticizing agent to separate from the composition.

The effectiveness of alkyl esters of abietic acid has been found to be most marked in conjunction with the phenolic resins prepared from cresols or xylenols with formaldehyde or equivalent methylene-containing agents. A further marked improvement, particularly as to water resistance, has been obtained by the incorporation of such agents in the resins of the character described in Patent No. 2,151,975, March 28, 1939, and prepared with alkyl amines or nitrogenous base catalysts.

Specific illustrations of this invention are the following:

*Example 1.*—As an example of adding abietates to the usual ammonia catalyzed resin varnishes, a resin was prepared by reacting 6000 grams of cresol with 4680 grams of 37% aqueous formaldehyde in the presence of 210 grams of ammonia; other basic catalysts as NaOH can be substituted but ammonia is preferable as it leaves no undesirable residue in the resin. The mass was refluxed for 70 minutes at 100° C. and then dehydrated in the usual way with vacuum and finally dissolved with 4230 grams of alcohol. The resulting varnish had a viscosity of 638 centipoises and contained approximately 60 per cent resin. To 6000 parts of the above varnish containing 3600 parts of resin there was then added 1260 parts of methyl abietate and the resulting mass refluxed for one hour. The final varnish had a viscosity of 514 centipoises.

The ratio of cresol to formaldehyde mentioned above can be varied widely and in place of cresol xylenols or mixtures of cresols and phenol or xylenols and phenol can be used.

*Example 2.*—As an example of adding abietates to a varnish incorporating a resin made with special amines as described in U. S. Patent No. 2,151,975, 100 parts of cresol or commercial xylenol, 80 parts of 37% aqueous formaldehyde, and 0.3 part of 33% solution of trimethylamine were refluxed for 60 minutes and the batch was then dehydrated with vacuum in the usual manner and dissolved with alcohol as before to produce a varnish of 60 per cent solids; in place of trimethylamine other nitrogenous base catalysts can be used as diethylamine, triethylamine, triamylamine, etc., or more generally a catalyst of the formula (alkyl)₂ N—R where R is hydrogen or an alkyl radical. Methyl abietate was added in the same ratio as before and the batch refluxed for one hour.

The amount of abietate used can be widely varied between 10 to 30 per cent to give any desired flexibility within this range and alkyl abietates other than methyl can be used though not as effectively.

The above varnishes were used to impregnate paper, such as 6 mil alpha cellulose, in the usual manner. The impregnated sheets were stacked and submitted to a pressure of 1200 pounds per square inch and a temperature corresponding to 80 pounds steam for 30 to 50 minutes whereupon the varnish sets to the infusible insoluble form. Laminated of any desired thickness can be obtained by varying the number of sheets.

To show the improved water resistance the following results were obtained with samples of laminated material 1 inch by 3 inches immersed in water at room temperature for 24 hours; no special surface sheets were used for the laminated. For comparison, data obtained with laminated materials having as the resinous binder the one described in Example 1 and including in equivalent amounts the commonly used plasticizers as well as one without any plasticizer, are added.

| | Per cent resin | Original thickness, inches | Increase in thickness after 24 hours in water, room temp. | Per cent increase in weight after 24 hours in water, room temp. |
|---|---|---|---|---|
| Laminated with varnish made as in Example 1 | 48.8 | 0.031 | 0.003 | 1.96 |
| Laminated with varnish made as in Example 2 | 47.5 | .077 | .002 | 1.17 |
| Laminated with varnish using tung oil as plasticizer | 48.0 | .074 | .004 | 3.44 |
| Laminated with varnish using an alkyl phthalate as plasticizer | 41.6 | .030 | .005 | 2.51 |
| Varnish without any plasticizer | 48.0 | .089 | .002 | 1.20 |

As indicative of the electrical properties obtained with the various types of flexible varnishes the following data are given:

| | Power factors | | | Dielectric strength, corrected to 1/8" thickness, volts/mil |
|---|---|---|---|---|
| | 60 cycles | 1000 cycles | 1 million cycles | |
| Laminated with varnish made as in Example 1 | Percent 2.07 | Percent 1.36 | Percent 3.11 | 665 |
| Laminated with varnish made as in Example 2 | 6.88 | 2.82 | 3.45 | 580 |
| Laminated made with varnish using vegetable oil as plasticizer | 1.38 | 1.30 | 3.37 | 625 |
| Laminated made with varnish using alkyl phthalate plasticizer | 2.64 | 2.73 | 5.40 | 480 |

Typical mechanical properties are as follows:

| | Tensile strength | | Flexural strength | | Modulus of elasticity | |
|---|---|---|---|---|---|---|
| | Lengthwise, lb./sq. in. | Crosswise, lb./sq. in. | Lengthwise, lb./sq. in. | Crosswise, lb./sq. in. | Lengthwise, lb./sq. in. | Crosswise, lb./sq. in. |
| Laminated with varnish made as in Example 1 | 17,200 | 11,255 | 24,020 | 17,555 | $1.50 \times 10^6$ | $1.12 \times 10^6$ |
| Laminated with varnish made as in Example 2 | 18,415 | 13,735 | 25,415 | 20,290 | $1.55 \times 10^6$ | $1.04 \times 10^6$ |
| Laminated with varnish made using tung oil as plasticizer | 17,615 | 13,395 | 26,115 | 22,815 | $1.25 \times 10^6$ | $1.01 \times 10^6$ |

From the above tables it is apparent that varnishes prepared in the manner as herein described have marked advantages in that they produce laminated materials which are flexible and at the same time resistant to water; the laminated made with the varnish of Example 2, is as fully resistant to water as a straight varnish without any plasticizer, and far more resistant than the oil-plasticized varnish. They have in addition excellent electrical and mechanical properties. The laminated materials made with the varnishes of Examples 1 and 2 have the flexibilities requisite for punching and shearing in the usual manner.

What is claimed is:

1. Varnish composition of heat-hardenable character useful as a binder for the preparation of laminated materials comprising in solution a resinous, ammonia-catalyzed reaction product of formaldehyde and a phenol selected from the group consisting of cresols, xylenols, mixtures of cresols and phenol, and mixtures of xylenols and phenol, and a plasticizer for the product comprising methyl abietate in amount by weight ranging from ten to thirty per cent of the total solids content of the composition.

2. Varnish composition of heat-hardenable character useful as a binder for the preparation of laminated materials comprising in solution a resinous, alkylamine-catalyzed reaction product of formaldehyde and a phenol selected from the group consisting of cresols, xylenols, mixtures of cresols and phenol, and mixtures of xylenols and phenol, and a plasticizer for the product comprising methyl abietate in amount by weight ranging from ten to thirty per cent of the total solids content of the composition.

3. Varnish composition of heat-hardenable character useful as a binder for the preparation of laminated materials comprising in solution a resinous, nitrogenous base-catalyzed reaction product of formaldehyde and a phenol selected from the group consisting of cresols, xylenols, mixtures of cresols and phenol, and mixtures of xylenols and phenol, and a plasticizer for the product comprising methyl abietate in amount by weight ranging from ten to thirty per cent of the total solids content of the composition.

4. Composition of heat-hardenable character comprising a resinous ammonia-catalyzed reaction product of formaldehyde and a phenol selected from the group consisting of cresols, xylenols, mixtures of cresols and phenol, and mixtures of xylenols and phenol, and a plasticizer for the product comprising methyl abietate in amount by weight ranging from ten to thirty per cent of the total solids content of the composition.

5. Composition of heat-hardenable character comprising a resinous alkylamine-catalyzed reaction product of formaldehyde and a phenol selected from the group consisting of cresols, xylenols, mixtures of cresols and phenol, and mixtures of xylenols and phenol, and a plasticizer for the product comprising methyl abietate in amount by weight ranging from ten to thirty per cent of the total solids content of the composition.

6. Composition of heat-hardenable character comprising a resinous nitrogenous base-catalyzed reaction product of formaldehyde and a phenol selected from the group consisting of cresols, xylenols, mixtures of cresols and phenol, and mixtures of xylenols and phenol, and a plasticizer for the product comprising methyl abietate in amount by weight ranging from ten to thirty per cent of the total solids content of the composition.

7. Laminated material having as a binder a heat hardened composition of a nitrogenous base-catalyzed phenolic-formaldehyde resin obtained as a reaction product of formaldehyde and a phenol selected from the group consisting of cresols, xylenols, mixtures of cresols and phenol, and mixtures of xylenols and phenol and methyl abietate in amount by weight ranging from ten to thirty per cent of the composition as a plasticizer for the resin.

HARRY KLINE.